(12) United States Patent
Christie

(10) Patent No.: US 9,145,055 B2
(45) Date of Patent: Sep. 29, 2015

(54) SYSTEMS AND METHODS FOR PRESENTING INFORMATION TO AN AUTOMOBILE DRIVER

(75) Inventor: Cameron Christie, Palto Alto, CA (US)

(73) Assignee: VOLKSWAGEN AG, Wolfsburg (DE)

( * ) Notice: Subject to any disclaimer, the term of this patent is extended or adjusted under 35 U.S.C. 154(b) by 764 days.

(21) Appl. No.: 12/630,535

(22) Filed: Dec. 3, 2009

(65) Prior Publication Data

US 2011/0137519 A1 Jun. 9, 2011

(51) Int. Cl.
*G06F 7/00* (2006.01)
*G05B 15/02* (2006.01)
*G01D 7/02* (2006.01)
*B60K 37/02* (2006.01)
*G04G 21/02* (2010.01)
*G04G 21/04* (2013.01)

(52) U.S. Cl.
CPC ............... *B60K 37/02* (2013.01); *G04G 21/02* (2013.01); *G04G 21/04* (2013.01); *B60K 2350/1064* (2013.01); *B60K 2350/203* (2013.01); *B60K 2350/2008* (2013.01); *B60K 2350/403* (2013.01); *B60K 2350/962* (2013.01); *B60K 2350/965* (2013.01)

(58) Field of Classification Search
CPC .... G04C 3/146; G04C 17/0091; G04G 21/00; G04G 21/04; G04G 9/0064; G04B 47/068; G04B 47/008; G04B 47/06; G04B 47/063; G04B 19/087; G01D 7/04; G01D 7/08; G01D 7/02; G01D 7/03
See application file for complete search history.

(56) References Cited

U.S. PATENT DOCUMENTS

| | | | | | |
|---|---|---|---|---|---|
| 4,004,546 | A | * | 1/1977 | Harland | 116/288 |
| 5,008,865 | A | * | 4/1991 | Shaffer et al. | 368/10 |
| 6,717,376 | B2 | * | 4/2004 | Lys et al. | 315/292 |
| 7,113,451 | B1 | * | 9/2006 | Matthey | 368/10 |
| 7,358,859 | B2 | * | 4/2008 | Chan | 340/601 |
| 7,623,415 | B2 | * | 11/2009 | Raeber et al. | 368/11 |
| 7,750,821 | B1 | * | 7/2010 | Taborisskiy et al. | 340/815.45 |
| 7,755,601 | B2 | * | 7/2010 | Yokota et al. | 345/110 |
| 2003/0076745 | A1 | * | 4/2003 | Chapman | 368/10 |
| 2003/0156046 | A1 | * | 8/2003 | Dwyer et al. | 340/973 |
| 2006/0055630 | A1 | * | 3/2006 | Cheang et al. | 345/44 |
| 2006/0073851 | A1 | * | 4/2006 | Colando et al. | 455/566 |
| 2006/0092769 | A1 | * | 5/2006 | Demas | 368/82 |
| 2007/0030425 | A1 | * | 2/2007 | Chan | 349/114 |

(Continued)

FOREIGN PATENT DOCUMENTS

DE 687143 C 1/1940 ............ F01D 17/08
DE 2557238 A1 6/1977 ............ B60K 35/00

(Continued)

*Primary Examiner* — Fadey Jabr
*Assistant Examiner* — Kevin P Mahne
(74) *Attorney, Agent, or Firm* — Slayden Grubert Beard PLLC

(57) ABSTRACT

An apparatus for displaying ambient information in a vehicle is provided. The apparatus includes a dial including a first dial hand, an ambient light source with a variable light intensity and a variable light color, a first data source and a second data source, a mode selector for selecting between a first mode of operation and a second mode of operation, and a controller coupled to the mode selector, the ambient light source, and the first dial hand. The controller is configured to, in the first mode of operation, control the position of the first dial hand according to the first data source; and, in the second mode of operation, control at least one of the variable light intensity or the variable light color of the ambient light source according to the second data source.

16 Claims, 3 Drawing Sheets

(56) References Cited

U.S. PATENT DOCUMENTS

2008/0062818 A1* 3/2008 Plancon et al. .................. 368/10
2008/0079591 A1* 4/2008 Chow ............................ 340/601
2008/0204268 A1* 8/2008 Dowling et al. ......... 340/815.45
2008/0211652 A1* 9/2008 Cope et al. .................... 340/461
2008/0304274 A1* 12/2008 King et al. .................... 362/487
2009/0322505 A1* 12/2009 Sullivan et al. ............... 340/438

FOREIGN PATENT DOCUMENTS

| DE | 9311917 U1 | 12/1993 | ............. B60K 35/00 |
| DE | 10021101 A1 | 11/2001 | ............. B60K 37/02 |
| DE | 10021107 A1 | 11/2001 | ............. B60K 35/00 |
| DE | 102004049573 A1 | 4/2006 | ............. B60K 35/00 |
| DE | 102005011824 A1 | 9/2006 | ............. B60K 35/00 |
| DE | 102008055901 A1 | 6/2009 | ............. B60K 35/00 |
| EP | 0807823 A2 | 11/1997 | ............. B60K 37/02 |

* cited by examiner

SYSTEMS AND METHODS FOR PRESENTING INFORMATION TO AN AUTOMOBILE DRIVER

TECHNICAL FIELD

The present disclosure relates generally to systems and methods for presenting information to an automobile driver. This presentation of information may, for example, be rendered by an ambient display in the dashboard.

BACKGROUND

At present, a driver is presented with various analog and digital gauges and readouts presenting specific, predetermined types of information. This information typically relates to the operational parameters of the vehicle, e.g., time, velocity, rotational velocity of the engine, voltage of the power system, various temperatures and pressures, and fill levels for one or more critical fluids. In addition, some vehicles may be equipped with displays providing information on, and interaction with, GPS-based navigation systems, climate control systems, and entertainment systems. These approaches are often either inflexible or overly rich with information.

SUMMARY

In accordance with the teachings of the present disclosure, disadvantages and problems associated with existing automobile information presentation have been reduced.

In certain embodiments, an apparatus for displaying ambient information in a vehicle is provided. The apparatus includes a dial including a first dial hand, an ambient light source with a variable light intensity and a variable light color, a first data source and a second data source, a mode selector for selecting between a first mode of operation and a second mode of operation, and a controller coupled to the mode selector, the ambient light source, and the first dial hand. The controller is configured to, in the first mode of operation, control the position of the first dial hand according to the first data source; and, in the second mode of operation, control at least one of the variable light intensity or the variable light color of the ambient light source according to the second data source.

In certain embodiments, a method is provided for displaying ambient information in a vehicle comprising. A first user input is received selecting a first mode of operation. A variable light intensity of an ambient light source is set, the ambient light source being incorporated into a dial, to a default intensity and a variable light color of the ambient light source is set to a default color. A first data value is received from a first data source. A first dial hand is positioned on the dial according to the first data value received from the first data source. A second user input is received selecting a second mode of operation. Data is received from a second data source. The variable light intensity and the variable light color are set according to the second data source.

In certain embodiments, a controller for displaying ambient information in an instrument component is provided. The controller includes a dial including a first dial hand, an ambient light source with a variable light intensity and a variable light color, a first data source, and a second data source. The controller is configured to receive a first user input selecting the first mode of operation, set the variable light intensity of an ambient light source incorporated into a dial to a default intensity and the variable light color of the ambient light source to a default color, receive a first data value from the first data source, control the position of a first dial hand on the dial according to the first data value received from the first data source, receive a second user input selecting the second mode of operation, receive data from the second data source, and set the variable light intensity and the variable light color according to the second data source.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages over the prior art are best understood by reference to FIGS. 1-3 below. However, the present disclosure may be more easily understood in the context of a high level description of certain embodiments.

The following non-limiting scenario may help the reader understand one or more aspects of the present invention. An automobile driver enjoys following his favorite baseball team while driving on long trips. Unfortunately for the driver, he also takes many phone calls from clients while driving and must turn off the car radio during these calls in order to minimize the noise level during the call. The present invention may provide generalized, real-time information about the game, e.g., the score or score differential between the two teams, without distracting from the conversation or from the task of driving the vehicle. According to one embodiment, an instrument component may display the current time in one mode and may display information about a baseball game in another mode. In this second mode, the face of the instrument component may, for example, glow red if the driver's favorite team is losing, yellow if it is a tie game, and green if they are winning. Further, the hands of the clock may rotate together, e.g., appearing to move like a single needle on a dial, to indicate the inning. For example, if the hands are both pointing to the eight o'clock position, the driver will know that the game is in the eighth inning.

Figure 1:
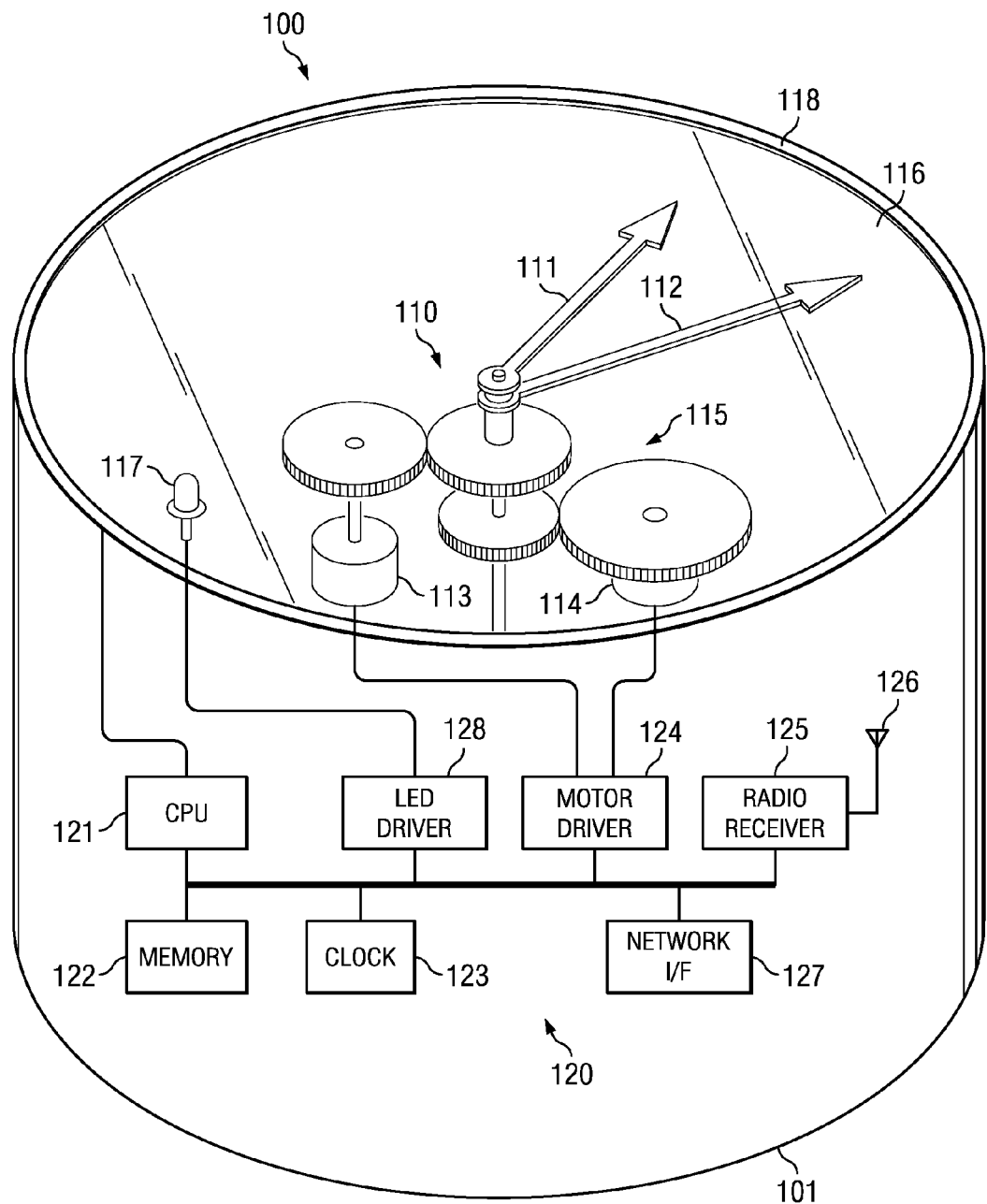
FIG. 1 illustrates an example instrument component, according to certain embodiments of the present disclosure.

FIG. 1 illustrates an instrument component, according to certain embodiments of the present disclosure. Instrument component 100 includes body 101, movement device 110

(including arms 111 and 112, motors 113 and 114, and transmission system 115), face 116, light source 117, bezel 118, and controller unit 120. Controller unit 120 includes central processing unit (CPU) 121, memory 122, real-time clock 123, motor driver 124, radio receiver 125 with antenna 126, network interface 127, and light emitting diode (LED) driver 128. Instrument component 100 may be a dual or multipurpose electromechanical gauge presenting in one mode, for example, the current time, date, or rotational velocity of the engine, and presenting in another mode, for example, information about the current status of a baseball game. Instrument component 100 may present one or more types of information at given point in time.

Body 101 is a housing for the instrument component. Body 101 encloses, in whole or in part, the subcomponents (e.g., movement device 110 and controller unit 120) to provide containment, protection, and/or modular installation and removal of the instrument component. In some embodiments, body 101 may be a hollow cylinder made of, for example, plastic or metal, designed to be received into an instrument panel on an automobile. Body 101 may be fully enclosed.

Movement device 110 is a system of sub-components coupled together to allow motors to turn the hands of the instrument such that data may be translated into hand positions. Movement device 110 includes hands 111 and 112, which may be controlled independently by motors 113 and 114, respectively, via transmission system 115. In one embodiment movement device 110 may include one, two, or more hands for displaying information. Movement device 110 may allow bidirectional movement of a hand or may require clockwise motion to achieve a new hand position behind the current one.

Hands 111 and 112 are visual indicators, e.g., clock hands. In some embodiments, hands 111 and 112 may indicate the hour and minute, respectively, of the current time. Hands 111 and 112 may be the same length or may be different lengths. Hands 111 and 112 may be flat metal pieces or may be made of some other suitable material. In a mechanical display, hands 111 and 112 may be connected to concentric shafts enabling each to be driven independently. In some embodiments, hands 111 and 112 may be represented as display elements on a liquid crystal (LCD) or light emitting diode (LED) display. While FIG. 1 illustrates two hands 111 and 112, some embodiments may have only one hand or may have more than two hands. In some embodiments, hands 111 and 112 may be illuminated by an integral light source such as a organic light emitting diode (OLED) surface enabling independent control of the color and/or brightness of each hand.

Motors 113 and 114 provide the driving force for rotating hands 111 and 112, e.g., via transmission system 115. For example, if hands 111 and 112 are used to display the current time, motors 113 and 114 may be activated, continuously or at a regular interval, to align hands 111 and 112 with the current time, e.g., where a full rotation of hand 111 represents the passage of twelve hours while a full rotation of hand 112 represents the passage of 60 minutes. Motors 113 and 114 may be stepper motors enabling precise control of the position of each of hands 111 and 112. Alternatively, motors 113 and 114 may be more traditional direct current electric motors, but a feedback mechanism may be required to enable precise position control. While FIG. 1 illustrates two motors 113 and 114, some embodiments may have only one motor or may have more than two motors.

Transmission system 115 is a system of components for translating the rotation of motors 113 and 114 into rotation of hands 111 and 112. Transmission system 115 may allow motors 113 and 114 to be positioned some distance from hands 111 and 112. Transmission system may include a combination of shafts and gears. In some embodiments, transmission system 115 may include belts, magnetic elements, friction connections, or other components.

Face 116 is a transparent or translucent cover between the hands (111, 112) and light source 117. Face 116 may translate a point source of light 117 into a non-directional or ambient light source. For example, if face 116 is transparent and light emitting diode 117 is producing green light, the driver of the vehicle will likely see a bright point of light in the dash. In contrast, if face 116 is translucent, face 116 will soften and distribute the light produced by light source 117 across much or all of face 116. In some embodiments, light source 117 is a diffuse source of light, e.g., an organic light emitting diode (OLED) of roughly the same surface area as face 116, in which case face 116 may be transparent.

Light source 117 is a controllable source of light that is used to produce an ambient, or diffuse, light. Light source 117 may produce monochromatic light or may produce a variety of colors. Light source 117 may be a single light-producing element or may be a combination of multiple elements. Light source 117 may have varying brightness levels.

Bezel 118 provides an input mechanism for the driver. Bezel 118 forms the perimeter of instrument component 110. Bezel 118 may be structural and/or aesthetic in nature. In some embodiments, bezel 118 may be metallic or have a metallic core enabling the sense of the driver's touch by processor 121. In some embodiments, bezel 118 may be mounted on a switch, which is connected to processor 121.

Controller unit 120 controls the behavior of instrument component 100. Controller unit 120 includes a number of subcomponents, including CPU 121, memory 122, real-time clock 123, motor driver 124, radio receiver 125 with antenna 126, network interface 127, and light emitting diode (LED) driver 128. In some embodiments, each component of controller unit 120 may be contained within instrument component 100. In some embodiments, one or more components of controller unit 120 may be external to instrument component 100. For example, radio receiver 125 and antenna 126 may be incorporated into a mobile phone and connected, e.g., via network interface 127 to the remaining components of controller unit 120.

Processor 121 enables the execution of software instructions and the interaction of various other components. Processor 121 may be one or more microprocessors or microcontrollers capable of executing programmed software instructions. Processor 121 may be, for example, an ARM-based processor, a MIPS-based processor, or an X86 compatible processor. Processor 121 may be a low-power, embedded processor or microcontroller. Processor 121 operates in one or more operating modes. In certain embodiments, the current operating mode may be user-selected by, for example, a user pressing or touching bezel 118. In some embodiments, the current operating mode may be selected based on a triggering condition, determined at least in part by or recognized by processor 121. For example, a triggering condition may be the receipt by processor 121, e.g., via radio receiver 125 or network interface 127, of a weather alert bulletin or an announcement that a sporting event of interest to the user has begun. In another example, a triggering condition could be the recognition of a particular driver's key fob, which may instruct the vehicle to operate with that driver's preferred settings, including a particular operating mode for instrument component 100.

Memory 122 stores software instructions and data for use by CPU 121 and/or other components of controller unit 120. Memory 122 may be one or more of the following types of tangible computer-readable media, e.g., RAM, ROM, EPROM, flash memory, magnetic storage, or optical storage. Memory 122 may also include a combination of memory types. Memory 122 may be volatile, non-volatile, or include both volatile and non-volatile technologies.

Clock 123 maintains a real-time clock (i.e., a representation of the current time of day). Clock 123 may be an integrated circuit containing a crystal oscillator and a binary counter circuit.

Motor driver 124 enables precise control of the position of hands 111 and 112. In some embodiments, motor driver 124 includes a stepper motor controller circuit for precise, digital control of the hands, e.g., via stepper motors 113 and 114. In some embodiments, motor driver 124 includes a power control circuit and a feedback mechanism for determining the actual rotation of electric motors 113 and 114.

Radio receiver 126 provides reception of data from a radio frequency transmitter. Radio receiver 126 may be, for example, a GSM interface or FLEX pager network receiver. Radio receiver 126 may also receive data using other networking technologies including, e.g., WIMAX, cellular digital packet data, short message service, or a two-way pager network. In some embodiments, radio receiver may receive data, e.g., via antenna 126, from subscription network. In some embodiments, radio receiver may receive data from various open data sources, e.g., over a wireless internet connection. In some embodiments, radio receiver 126 may receive only relevant information, e.g., information that has been addressed to a specific instrument component 110 or class of instrument components 110. In some embodiments, radio receiver 126 receives broadcast information that may be filtered for relevance by processor 121.

Network interface 127 provides connectivity with one or more other devices in the vehicle. Network interface 127 may be, for example, on-board diagnostic system (OBD), Ethernet, WiFi, Bluetooth, or wireless USB. Network interface 127 may be a wired or wireless connection and may be continuously available or intermittent. In some embodiments, network interface 127 may provide access by processor 121 to vehicle data including, e.g., performance data, maintenance schedules, or computer fault codes. In some embodiments, network interface 127 may provide access by processor 121 to location information via a global positioning system compatible device in the vehicle. In some embodiments, network interface 127 may provide access by processor 121 to data received by the driver's personal mobile device, e.g., mobile phone or email device.

FIGS. 2a through 2e illustrate various example display modes of instrument component 100, as viewed by the vehicle driver, according to certain embodiments of the present disclosure. Each figure is bounded by body 101 and bezel 118. Face 116 is illustrated as a large disk, which is shaded in FIGS. 2b through 2d to represent the emission of ambient light. Hands 111 and 112 are also illustrated in various positions. Controller 120 may control the light level and color of face 116 via LED driver 128 and the position of hands 111 and 112 via motor driver 124. Controller 120 may accept input, e.g., by sensing a touch or press of bezel 118, and cycle through two or more display modes. In some embodiments, a user may configure and/or create display modes, e.g., through a web interface. These configurations may be transferred to controller 120 via radio receiver 125 or network interface 127. The modes illustrated in FIGS. 2a through 2e are illustrative only and may be combined or modified to produce additional modes of operation.

Figure 2A:
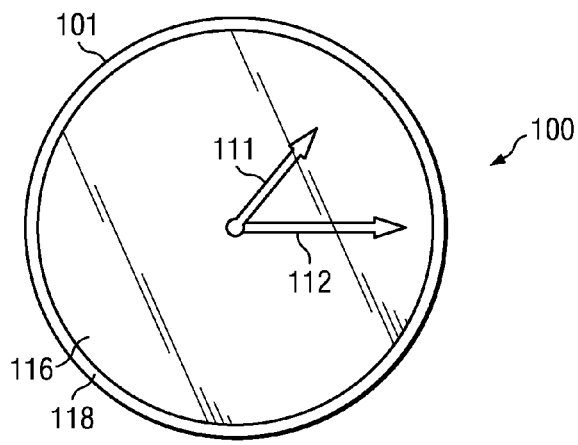
FIG. 2a illustrates the example instrument component of FIG. 1 in a clock display mode, according to certain embodiments of the present disclosure.

FIG. 2a illustrates instrument component 100 in a clock display mode, according to certain embodiments of the present disclosure. In this mode, hands 111 and 112 rotate to display the current time, which may be read from real-time clock 123. For example, hand 111 may represent the current hour, e.g., where a vertical orientation pointed upward represents 12 o'clock and a clockwise rotation of thirty degrees (three hundred sixty degrees divided by twelve hours) from the 12 o'clock position represents 1 o'clock. Similarly, hand 112 may represent the current minute, e.g., where a vertical orientation pointed upward represents zero minutes past the current hour and a clockwise rotation of six degrees (three hundred sixty degrees divided by sixty minutes) represents one minute past the current hour. In some embodiments, face 116 may be unlit, or lit to approximately match the backlighting of other dashboard components in the vehicle. In some embodiments, processor 121 may use an interrupt mechanism to trigger a regular polling cycle wherein processor 121 may read the value of real-time clock 123 and adjust the position of hands 111 and 112 based on the new time. In certain embodiments, processor 121 may receive time information via radio receiver 125 from an external time source. This time information may be used to update real-time clock 123 or in place of real-time clock 123.

Figure 2B:
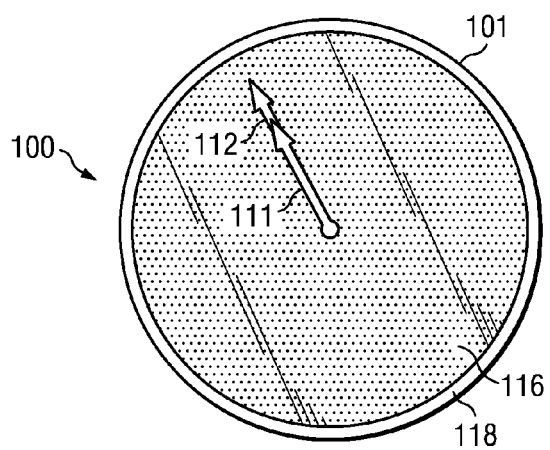
FIG. 2b illustrates the example instrument component of FIG. 1 in a gauge mode, wherein both hands are driven in a synchronized fashion to resemble a single hand, according to certain embodiments of the present disclosure.

FIG. 2b illustrates instrument component 100 in a gauge mode, wherein both hands are driven in a synchronized fashion to resemble a single hand, according to certain embodiments of the present disclosure. In this mode, hands 111 and 112 appear as a single hand rotating to convey a single data value. For example, hands 111 and 112 may be used to display the current fuel economy in miles per gallon or the current engine rotational speed in revolutions per minute. In some embodiments, processor 121 may regularly poll the vehicle computer via network interface 127 for this information. In another example, hands 111 and 112 may be used to display a wireless signal strength, e.g., for a WiFi, WiMAX or GSM signal. This wireless signal strength may be, for example, determined by processor 121 based on information gathered by radio receiver 125. In certain embodiments, face 116 (lit from behind by light source 117) may glow a different color or intensity from other instrument components in the vehicle dashboard. This ambient light may be used to indicate to the vehicle driver that the instrument component is no longer in the clock mode.

Figure 2C:
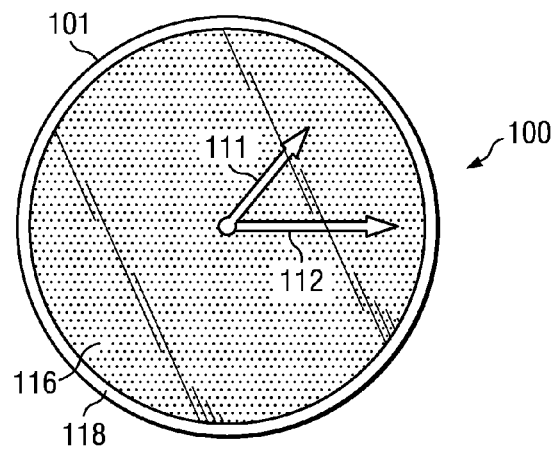
FIG. 2c illustrates the example instrument component of FIG. 1 in an ambient display mode, according to certain embodiments of the present disclosure.

FIG. 2c illustrates instrument component 100 in an ambient display mode, wherein the hands are displaying the current time (as in the clock display mode of FIG. 2a) while face 116 (lit from behind by light source 117) may glow a different color or intensity from other instrument components in the vehicle dashboard, according to certain embodiments of the present disclosure. In this mode, the glow of face 116 may vary to display a discrete or continuously variable set of values. In the following examples, the unit of measurement for temperature will be in degrees Fahrenheit. For example, if the ambient display represents the current outdoor temperature, a dark blue color may represent forty degrees while a dark red color may represent one hundred degrees. In another example, the outdoor temperature may be context sensitive. If the temperature is generally below, e.g., fifty degrees, the ambient display mode may be used to illustrate certain cold weather extreme points. For example, a light blue color may indicate a safe fifty degrees while yellow may represent a near-freezing temperature. If the temperature falls below a further threshold, say negative twenty degrees, then the display may glow red to caution against the use of windshield wiper fluid to clean the windshield. When selected, this mode may initially cycle through the range of colors to help calibrate the driver's perception of the colors.

In another example, the ambient display mode may display weather information. This mode may display basic data, e.g., change in barometric pressure or humidity. Alternatively, this mode may display forecast data such as the likelihood and/or type of precipitation. For example, a forecast of rain may be displayed in green, sleet or freezing rain in red, and snow in white. The intensity or darkness of color may indicate the chance of precipitation, e.g., bright or light green may indicate a high chance of rain, while a dark green may indicate a low chance. In some embodiments, certain weather conditions may be indicated with a bright and/or flashing glow. For example, a tornado or flash flood warning may be indicated with a flashing red glow. This may indicate to the driver that she should seek immediate shelter or high ground or may indicate that the driver should tune her radio to a weather announcement. In some embodiments, this weather information may be regional information received by radio receiver 125 may be location specific based, e.g., on Global Positioning System (GPS) data. In some embodiments, this weather information may be, for example, localized National Oceanic and Atmospheric Administration (NOAA) Weather Radio broadcast information.

Figure 2D:
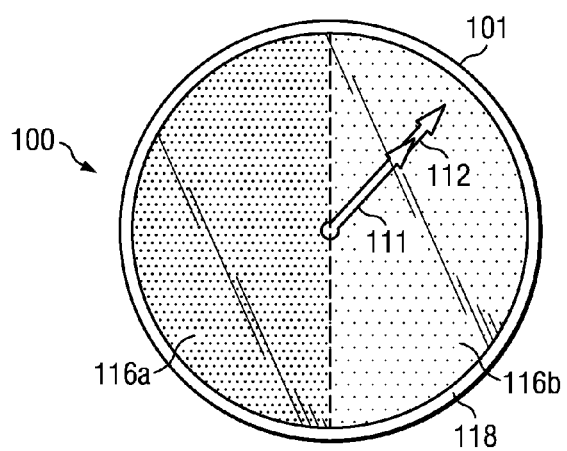
FIG. 2d illustrates the example instrument component of FIG. 1 in a dual display mode.

FIG. 2d illustrates instrument component 100 in a dual display mode. In this mode, hands 111 and 112 may display time information, according to certain embodiments of the present disclosure. Face 116 may display two different colors and/or levels of ambient light in regions 116a and 116b. In some embodiments, additional regions may be added. In yet other embodiments, face 116 may be a display, e.g., a liquid crystal display (LCD), with numerous available regions 116a.

In one example, the instrument component may be in a sport score display mode. Region 116a may represent the home team and glow in the home team's primary team color. Likewise, region 116b may represent the away team and glow in the away team's secondary team color. Hands 111 and 112 may move together to illustrate the relative lead one team may have over the other. For example, a 0-0 score may be represented with both hands in the six o'clock position, where as a 2-2 tie score may be represented with both hands in the twelve o'clock position. A 3-0 score may be illustrated as a significant lead (e.g., in ice hockey or soccer) with both hands in the nine o'clock position, or a slight lead (e.g., American football or basketball) with both hands near the eleven o'clock position.

In another example, the instrument component may be in a energy output mode for a hybrid gas/electric vehicle. In this mode, region 116a may glow green indicating the electric output mode. Further, hand 111 may rotate between the six o'clock position (0%), the nine o'clock position (50%) and the twelve o'clock position (100%) to indicate the relative output of the electric transfer system of the vehicle. Likewise, region 116b may glow yellow indicating the gasoline motor output mode. Hand 112 may rotate between the six o'clock position (0%), the three o'clock position (50%) and the twelve o'clock position (100%) to indicate the relative output of the gasoline transfer system of the vehicle.

Figure 2E:
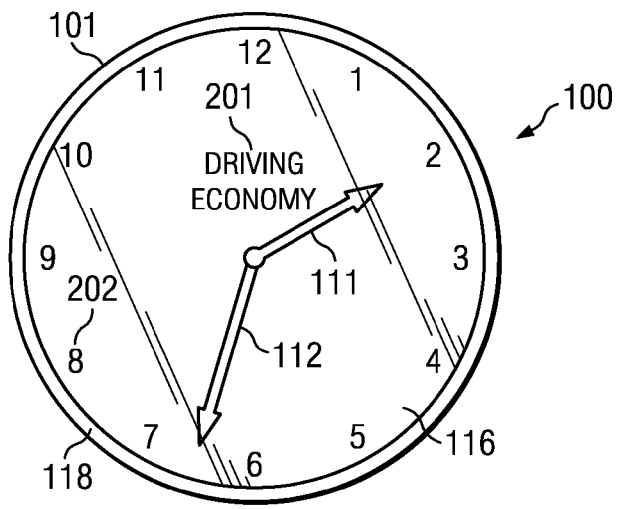
FIG. 2e illustrates the example instrument component of FIG. 1 with additional display elements, according to certain embodiments of the present disclosure.

FIG. 2e illustrates instrument component 100 with additional display elements 201 and 202, according to certain embodiments of the present disclosure. Display element 201 may be a fixed mode indicator capable of being lit or blank (e.g., the check engine indicator on many production vehicles) or may be a variable display, or a region of a variable display, such as an LCD or LED. Display element 201 may be used to provide additional information to the vehicle driver, such as the name of the current mode. In some embodiments, Display element 201 may be blank or nearly invisible if the instrument component is in clock mode. Display elements 202 may be permanently visible numbers representing the twelve hour positions on a clock. In some embodiments, display elements 202 may be separately lit from face 116 allowing them to become nearly invisible in certain modes. In some embodiments, display elements 202 are regions of a variable display, such as an LCD or LED, and may illustrate hour positions (one through twelve) in clock mode or percentages (e.g., in ten percent increments) in a vehicle output mode or weather forecast mode.

Figure 3:
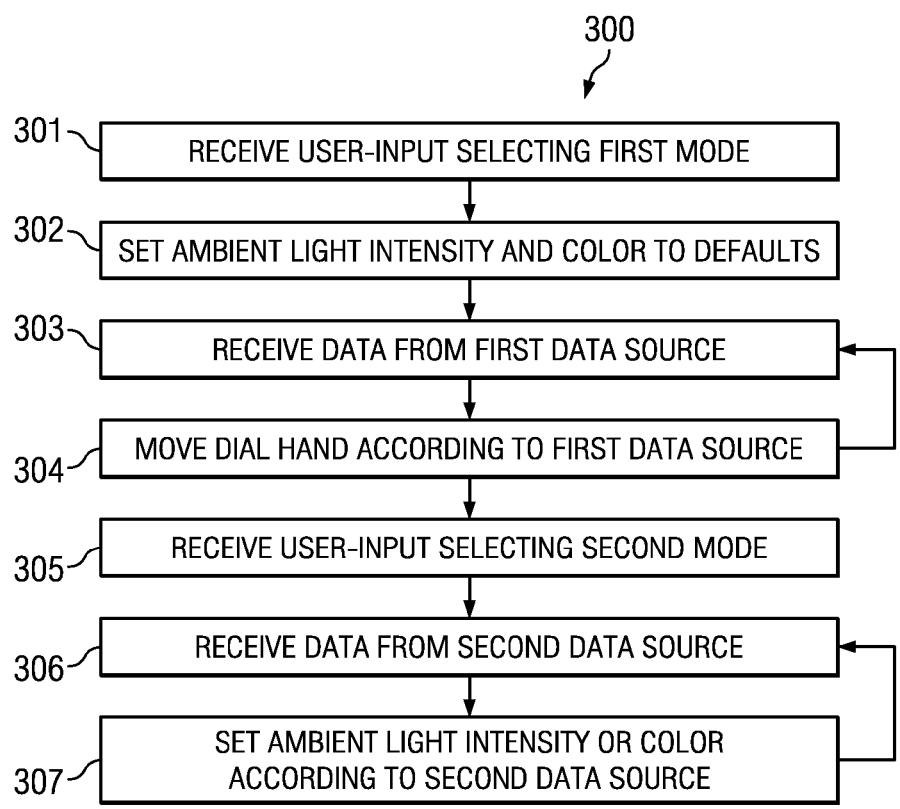
FIG. 3 illustrates an example method for displaying information to the driver of a vehicle using ambient light, according to certain embodiments of the present disclosure.

FIG. 3 illustrates a method for displaying information to the driver of a vehicle using ambient light, according to certain embodiments of the present disclosure. Method 300 includes steps of receive user-input selecting first mode 301, set ambient light intensity and color to defaults 302, receive data from first data source 303, move dial hand according to first data source 304, receive user-input selecting second mode 305, receive data from second data source 306, and set ambient light intensity or color according to second data source 307. Method 300 is illustrated as a sequential set of steps, but one of skill in the art would understand that the sequence may be altered in keeping with the concepts described in the present disclosure.

At step 301, the user selects a first mode of operation, e.g., by touching or pressing bezel 118. Processor 121 accepts this input and executes a software routine implementing the first mode of operation. This software routine may already be stored locally, for example, in memory 122, or may be retrieved on demand via network interface 127.

At step 302, processor 121 sends a command to LED driver 128 to set the ambient light level produced by LED 117 to a default color and default intensity. In some embodiments, the default values may be static, e.g., light blue and 20% of maximum. In other embodiments, the default values may be set to match or approximate the color and intensity of illumination of other instrument components in the vehicle. In yet other embodiments, the default color may be mode specific, e.g., light blue for clock mode and light green for thermostat mode.

At step 303, processor 121 receives data from a first data source, e.g., real-time clock 123. Processor 121 may interpret this data by, for example, converting the number of seconds elapsed since Jan. 1, 1970 into the current hour and minute. Processor 121 may further interpret this data according to the driver's home or current time zone and/or the applicability of daylight savings time.

At step 304, processor 121 instructs motor driver 124 to move a dial hand according to the first data source. In some embodiments, processor 121 may specify a rotation distance from a fixed point, e.g., degrees clockwise from twelve o'clock, or may specify a specific rotation from the current hand position, e.g., degrees clockwise or counterclockwise from the current position. Motor driver 124 translates the instruction from processor 121 into physical movement of the dial hand, e.g., by applying power to motor 113 (or 114), which then applies mechanical force via drive train 115 to hand 111 (or 112). In some embodiments, after receiving an instruction to move hand 111 from the four o'clock position to halfway between the two and three o'clock positions, motor driver 124 may cause hand 111 to rotate clockwise ten and a half hours (i.e., 315 degrees). In some embodiments, after receiving the same instruction, motor driver 124 may cause hand 111 to rotate counterclockwise one and a half hours (i.e., 45 degrees). In certain embodiments, motor driver 124 will accept instructions to rotate one or more hands (111 and/or 112) in a specific direction.

While the first mode of operation is maintained, processor 121 may wait for, or poll for, new or varied data from the first data source. In some embodiments, processor 121 repeatedly, over some fixed interval, retrieves this data and automatically translates the data into a hand position for motor driver 124. In other embodiments, processor 121 waits for an event, e.g., a real-time interrupt or a data arrival event, before retrieving data and translating that data into a hand position.

At step 305, the user selects a second mode of operation, e.g., by touching or pressing bezel 118. Processor 121 accepts this input and executes a software routine implementing the second mode of operation. This software routine may already be stored locally, for example, in memory 122, or may be retrieved on demand via network interface 127.

At step 306, processor 121 receives data from a second data source, e.g., via radio receiver 125 and/or network interface 127. In one example, this data is a current temperature reading from the National Weather Service. In another example, the temperature reading may have been retrieved from one or more vehicle sensors, e.g., via network interface 127. Processor 121 then analyzes the received data to transform it into an ambient light intensity and/or color. Processor 121 may, for example, determine that a near freezing temperature value should be represented as a dark blue color and may determine that the light intensity should pulsate to convey a warning of possible frozen precipitation.

At step 307, processor 121 sends a command to LED driver 128 to set the ambient light level produced by LED 117 to the color and intensity determined based on data received at step 306. In some embodiments, this step may repeat at some interval, for example where a pulsating effect is desired. In the example of the pulsating blue color representing near freezing outdoor temperatures, processor 121 may operate on a loop sending a progressively higher intensity value to LED driver 128 over some interval before sending a progressively lower value, and then repeating.

While the second mode of operation is maintained, processor 121 may wait for, or poll for, new or varied data from the second data source. In some embodiments, processor 121 repeatedly, over some fixed interval, retrieves this data and automatically translates the data into an ambient light color and intensity. In other embodiments, processor 121 waits for an event, e.g., a real-time interrupt or a data arrival event, before retrieving data and translating that data into an ambient light color and intensity.

For the purposes of this disclosure, the term exemplary means example only. Although the disclosed embodiments are described in detail in the present disclosure, it should be understood that various changes, substitutions and alterations can be made to the embodiments without departing from their spirit and scope.

What is claimed is:

1. An apparatus for displaying ambient information in a vehicle comprising:
   a dial including a first physical dial hand and a second physical dial hand configured to rotate around a common axis, the first physical dial hand comprising an hour hand and the second physical dial hand comprising a minute hand;
   a motor driver configured to drive a first motor mechanically connected to the first physical dial hand and second motor mechanically connected to the second physical dial hand;
   a layer of translucent material forming a face of the dial;
   an ambient light source with a variable light intensity and a variable light color,
   wherein the ambient light source is positioned behind the layer of translucent material;
   an ambient light source driver;
   a radio receiver;
   a first data source comprising a real-time clock providing hour and minute information and a communication interface for receiving data from a second data source remote from the apparatus via the radio receiver;
   a controller including a processor, the processor communicatively couple to the radio receiver, the motor driver, the first data source, the communication interface, the ambient light source driver, and the first dial hand, the controller configured to:
   receive a selection between a first mode of operation and a second mode of operation;
   in the first mode of operation, communicate control signals to the motor driver to control the position of the first and second physical dial hands according to the real-time clock to indicate the current hour and minute; and
   in the second mode of operation, receive dynamically changing data from the remote second data source via the communication interface, and based on the dynamically changing data received from the second data source over time, both (a) communicating motor control signals to the motor to dynamically control the position of at least the first physical dial hand and (b) communicating light control signals to the ambient light source driver to dynamically control at least one of the variable light intensity or the variable light color of the ambient light source aver time based on the dynamically changing data received from the second data source over time.

2. The apparatus of claim 1, wherein:
   the controller is further configured to:
   in the first mode of operation, control the second dial hand according to the first data source; and
   in the second mode of operation, control the second dial hand based on data received from the second data source.

3. The apparatus of claim 1, wherein the controller includes a microprocessor and a memory.

4. The apparatus of claim 1, wherein:
   the ambient light source includes a multicolor light emitting diode positioned behind the layer of translucent material; and
   the first dial hand is positioned in front of the layer of translucent material.

5. The apparatus of claim 1, wherein the controller receives a plurality of data values and at least one configuration parameter from the second data source.

6. The apparatus of claim 5, wherein in the second mode of operation, the controller is configured to control the variable light intensify and the variable light color based at least in part on the configuration parameter and at least one of the plurality of data values received from the second data source.

7. The apparatus of claim 5, wherein the at least one configuration parameter may be modified by a user via a web browser.

8. The apparatus of claim 1, wherein, the controller is further configured to:
   in the first mode of operation, set the variable light intensity to a default intensity and set the variable light color of the ambient light source to a default color.

9. The apparatus of claim 1, wherein the dynamically changing data from the remote second data source comprises temperature or weather data.

10. A method of displaying ambient information in a vehicle comprising:
    receiving a first user input selecting a first mode of operation;

setting, by a processor, a variable light intensity of an ambient light source to a default intensity and a variable light color of the ambient light source to a default color, wherein the ambient light source is positioned behind a layer of translucent material forming a dial face;

receiving hour and minute information from a first data source comprising a real-time clock;

communicating, by the processor, motor control signals to a motor driver to control a first physical dial hand on the dial according to the hour and minute information received from the first data source, the first physical dial hand comprising at least one of an hour hand and a minute hand;

controlling the position of the first dial hand according to the first data source;

receiving a second user input selecting a second mode of operation;

receiving dynamically changing data from a remote second data source via a radio receiver; and communicating, by the processor, motor control signals to the motor driver based on the dynamically changing data received from the second data source over time, controlling the position of the first dial hand according to the second data source, and communicating, by the processor, light control signals to the ambient light source driver to dynamically control at least one variable light intensity and the variable light color over time based on the dynamically changing data received from the second data source over time, and controlling the ambient light source according to the second data source.

11. The method of claim 10, further comprising receiving a plurality of data values and at least one configuration parameter from the second data source.

12. The method of claim 11, wherein the step of setting the variable light intensity and the variable light color according to second data source further comprises setting the variable light color based at least in part on the at least one configuration parameter and at least one of the plurality of data values received from the second data source.

13. A controller for displaying ambient information in an instrument component that includes a dial including a first physical dial hand, a motor driver configured to drive a motor mechanically coupled to the first physical dial hand, a layer of translucent material forming a face of the dial, an ambient light source positioned behind the layer of translucent material and having a variable light intensity and a variable light color, an ambient light source driver configured to control the ambient light source, a first data source, a radio receiver, and a communication interface for receiving data from a second data source remote from the apparatus, wherein the controller is configured to:

receive a first user input selecting the first mode of operation;

generate and communicate light source signals to the ambient light source driver to set the variable fight intensity of the ambient light source to a default intensity and the variable light color of the ambient light source to a default color;

receive hour and minute information from the first data source comprising a real-time clock;

generate and communicate motor control signals to the motor to control the position of the first physical dial hand on the dial according to the hour and minute information received from the first data source, the first physical dial hand indicating at least one of the hour and the minute;

receive dynamically changing data from the remote second data source via the radio receiver; and based on the dynamically changing data received from the second data source over time, both (a) generate and communicate motor control signals to the motor to control the position of the first physical dial hand and (b) generate and communicate light control signals to the ambient light source driver to dynamically control at least one of the variable light intensity and the variable light color over time.

14. The controller of claim 13, further configured to receive a plurality of data values and at least one configuration parameter from the second data source.

15. The controller of claim 14, wherein setting the variable light intensity and the variable light color according to second data source further comprises setting the variable light color based at least in part on the at least one configuration parameter and the at least one of the plurality of data vogues received from the second data source.

16. An apparatus for displaying ambient information in a vehicle comprising:

a dial including a first physical dial hand and a second physical dial hand configured to rotate around a common axis, the first and second dials hand comprising an hour hand and a minute hand;

a motor driver configured to drive a first motor mechanically connected to the first physical dial hand and second motor mechanically connected to the second physical dial hand;

a layer of translucent material forming a face of the dial;

an ambient light source with a variable light intensity and a variable light color, wherein the ambient light source is positioned behind the layer of translucent material;

an ambient light source driver;

a radio receiver;

a first data source including a real-time clock providing hour and minute information;

a communication interface for receiving data from a second data source remote from the apparatus via the radio receiver;

a controller including a processor, the processor communicatively couple to the radio receiver, the motor driver, the ambient light source driver, the first data source, the communication interface, and the first dial hand, the controller configured to:

receive a selection between a first mode of operation and a second mode of operation;

in the first mode of operation, communicate control signals to the motor to control the position of the first and second physical dial hands according to the real-time clock to indicate the current hour and minute; and in the second mode of operation, receive data from the remote second data source via the communication interface, the dynamically and based on the dynamically changing data received from the second data source over time, both (a) communicating motor control signals to the motor to dynamically control the position of at least the first physical dial hand and (b) communicating light control signals to the ambient light source driver to dynamically control at least one of the variable light intensity or the variable light color of the ambient light source over time.

* * * * *